United States Patent [19]

Shioda

[11] Patent Number: 5,105,263
[45] Date of Patent: Apr. 14, 1992

[54] PROJECTION DISPLAY APPARATUS USING COLOR TEMPERATURE CORRECTORS AND LIQUID CRYSTAL SHUTTERS

[75] Inventor: Katsunobu Shioda, Tokyo, Japan

[73] Assignee: Pioneer Electronic Corporation, Tokyo, Japan

[21] Appl. No.: 500,205

[22] Filed: Mar. 28, 1990

[30] Foreign Application Priority Data

Aug. 30, 1989 [JP] Japan ................. 1-223615

[51] Int. Cl.[5] .................... H04N 9/31; H04N 9/73
[52] U.S. Cl. .................... 358/29; 358/60; 359/84; 359/634; 359/888
[58] Field of Search ............ 358/60, 29, 231, 41, 358/29 C; 350/169, 314, 318, 448

[56] References Cited

U.S. PATENT DOCUMENTS

| | | | |
|---|---|---|---|
| 2,672,502 | 3/1954 | Albright | 358/60 |
| 3,744,893 | 7/1973 | Chandler | 353/75 |
| 3,751,580 | 8/1973 | Metzger | 358/29 |
| 3,818,129 | 6/1974 | Yamamoto | 358/60 |
| 3,890,628 | 6/1975 | Gurtler | 350/448 |
| 4,237,475 | 12/1980 | Sekiguchi | 358/41 |
| 4,346,399 | 8/1982 | Akutagawa et al. | 358/29 |
| 4,506,949 | 3/1985 | Knop | 350/314 |
| 4,525,745 | 6/1985 | Ghaem-Maghami et al. | 358/60 |
| 4,633,299 | 12/1986 | Tanaka | 358/29 |
| 4,701,788 | 10/1987 | Desjardins | 358/29 |
| 4,720,747 | 1/1988 | Crowley | 358/231 |
| 4,815,831 | 3/1989 | Betensky | 350/432 |
| 4,864,390 | 9/1989 | McKechnie et al. | 358/61 |
| 4,900,139 | 2/1990 | Kreitzer | 350/463 |
| 4,914,556 | 4/1990 | Richardson | 350/314 |
| 4,951,150 | 8/1990 | Browning | 358/60 |
| 5,001,552 | 3/1991 | Okino | 358/41 |
| 5,021,874 | 6/1991 | Tsugita | 358/41 |

FOREIGN PATENT DOCUMENTS 0092192 4/1988 Japan .
0095688 4/1989 Japan .
0312484 12/1990 Japan .

Primary Examiner—James J. Groody
Assistant Examiner—Jeffrey S. Murrell
Attorney, Agent, or Firm—Finnegan, Henderson, Farabow, Garrett and Dunner

[57] ABSTRACT

A projection display apparatus projects red, green and blue light emitted from three projection tubes. Each light component passes through a projection lens. A separate color temperature corrector is detachably coupled to each projection lens. The color temperature corrector may employ neutral density filters, color dividing means, or liquid-crystal shutters.

6 Claims, 7 Drawing Sheets

PROJECTION DISPLAY APPARATUS USING COLOR TEMPERATURE CORRECTORS AND LIQUID CRYSTAL SHUTTERS

BACKGROUND OF THE INVENTION

The present invention relates to a color projection display apparatus, and more particularly to a color temperature corrector in use with a projection display apparatus, which is well suitable for a multi-screen used in studios and theaters.

The projection display apparatus is used for projecting a video image, such as a television image, VTR reproduction image, and an image by a laser-vision disk (LVD), on a viewing screen in an enlarged fashion.

Two types of the projection display apparatuses are known such as a 3-tube color projection display apparatus and a liquid-crystal color projection display apparatus. The former uses three projection tubes (high brightness CRTs) for projecting three different mono-colors, red (R), green (G), and blue (B). The latter projects light emitted from an incandescent light source through liquid-crystal shutters on a viewing screen, to form an image on the screen. In the projection structure, the projection display apparatus consists of two types of display apparatus, a transmitting screen type and a reflecting screen type.

The projection display apparatus is used in studios and theaters, and at home as well. When the projection display apparatus is used in a studio or a theater, correction of a color temperature of the projection display apparatus becomes problematic. The light in a studio, for example, usually consists of artificial lights emitted from many types of illumination lamps, not natural light. Accordingly, a color temperature of the screen of the projection display apparatus is not always proper value. Therefore, the color temperature correction is required. Particularly where an image on the screen of the projection display apparatus, together with a human figure, for example, are picked up with a TV camera, one encounters a problem that when the image picked up is reproduced on a TV screen, the coloring of the reproduced image is indefinably unnatural. This results from the fact that the color temperature characteristic of the TV camera has been set in connection with the human figure alone. Therefore, to obtain the reproduced image of natural coloring, the color temperature of the projection display apparatus must be corrected with relation to the color temperature characteristic of the TV camera.

In a studio, a multi-screen is frequently used for the display screen of the projection display apparatus. The multi-screen is a large screen consisting of a number of projection display apparatus PJ, which are arrayed in a matrix fashion in a plane, as shown in FIG. 1.

In such a multi-screen, the color temperature correction must be applied to all of the projection display apparatus PJ similar to the above-described single screen projection display apparatus.

To correct the color temperature, a color temperature corrector is used. Three major systems of correcting the color temperature that have been known, a color corrector system, a colored film system, and an anode voltage control system, will be described.

1) Color Corrector System

This system corrects color tone and color distortion of a video signal derived from a video source (VS), such as an LVD and a VTR, by means of a color corrector. As shown in FIG. 2, a color corrector CC demodulates a video signal from a video source into R, G and B signals, corrects the signal levels of those signals, modulates them again into a corrected video signal, and sends it to a projection display apparatus PJ. On the basis of the corrected video signal, the apparatus PJ projects an image of a proper color temperature on a screen.

2) Colored Film System

This system is generally used in a projection display apparatus of the transmission screen type. To make the color temperature correction, as shown in FIG. 3, a colored film F, which has an absorption characteristic for color temperature correction, is attached to the front face of a screen S of a projection display apparatus PJ.

3) Anode Voltage Control System

This system is generally used in a projection display apparatus of the three-tube type. For the color temperature correction, the anode voltages of the projection CRTs are controlled in accordance with the parameters for correcting the color temperature, so that the amounts of lights emitted from the CRTs are controlled.

However, the color temperature correcting systems as mentioned above have the following disadvantages.

In the case of the color corrector system, adjustment of the color corrector is needed in addition to the adjustment of the projection display apparatus PJ. Further, when it is used in the multi-screen type shown in FIG. 1, the number of the correctors CC as required is equal to that of the projection display apparatus PJ. This results in increase of the cost to manufacture, and increase of the number of adjusting points.

In the case of the colored film system, a colored film of a large area is required because the screen per se of the projection display apparatus has a large area. Practically, it is very difficult to apply a colored film F over the screen S smoothly and uniformly or without wrinkles. The number of color temperature that one colored film can correct is only one. Therefore, to correct different color temperatures, a required number of colored films is equal to that of the color temperatures to be corrected. In case where the colored film system is applied to the multi-screen shown in FIG. 1, and the colored films are put on the screens of the projection display apparatus PJ, respectively, a variation in the optical characteristics of those films must be removed. Alternatively, those screens of the apparatus PJ may be covered with a single colored film. In this case, the film must be extremely large.

In the case of the anode voltage control system, the anode voltages must be varied in accordance with ambient conditions including ambient lights in a place where the projection display apparatus is installed. Further, it is difficult to standardize the color temperature correcting parameters. Additionally, it is difficult to stabilize high voltages of the anodes, e.g., about 30 kV. Further, when the projection display apparatus of the 3-tube type in which the power source for the electron guns of the tubes are connected in series, it is impossible to adjust the anode voltages of the three tubes individually. To individually adjust the anode voltages, the power sources must be arranged in parallel. This results a complicated circuit. In the case of the anode voltage control system, the color temperature may be indeed corrected by controlling the anode voltage, but a linearity of the color temperature correction becomes poor.

SUMMARY OF THE INVENTION

Accordingly, an object of the present invention is to provide a projection display apparatus provided with a color temperature corrector capable of correcting a color temperature with a simple structure.

To achieve the above object, there is provided a projection display apparatus for projecting lights respectively containing red, green and blue components emitted from light sources on a screen by means of projection lenses, improved in that for correcting a color temperature of an image on said screen, color temperature correctors are respectively disposed close to said projection lenses in the optical paths between said screen and said light sources, thereby to individually correct the amounts of the lights containing the red, green and blue components.

According to the present invention, the lights emitted from the light sources travel through the projection lenses and the color temperature correctors, and are focused on the screen. The color temperature correctors for the red, green and blue components are located closer to the projection lenses. Therefore, the amounts of lights can be corrected for each color component. This indicates that there is no need for correcting the color temperature on the screen. This leads to reduction of the resultant projection display apparatus.

Other objects, features and advantages of the present invention will be apparent from the following description taken in connection with the accompanying drawings.

DETAILED DESCRIPTION OF THE PREFERRED EMBODIMENTS

Some specific embodiments of a display projection apparatus according to the present invention will be described with reference to the accompanying drawings.

1st Embodiment

A first embodiment of a projection display apparatus according to the present invention will be described with reference to FIGS. 4 through 11.

Figure 4:
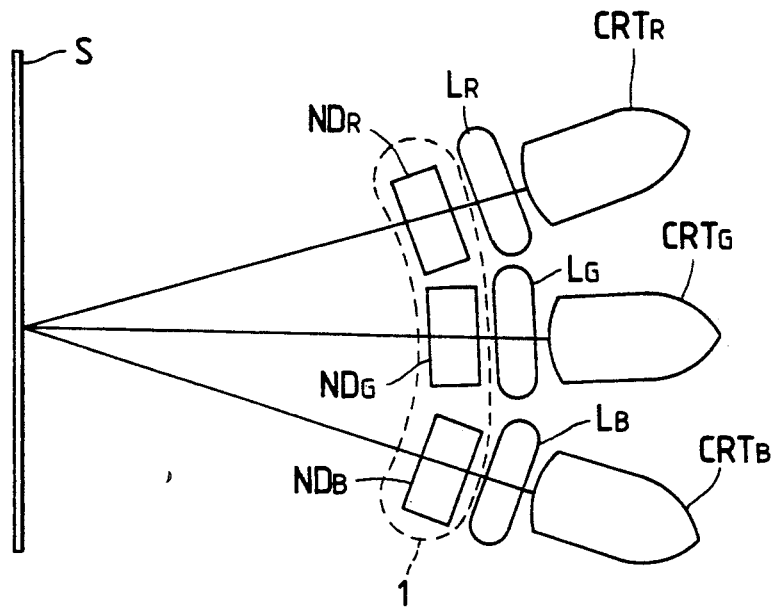
FIG. 4 shows a schematic illustration of a projection display apparatus according to a first embodiment of the present invention.
Figure 5:
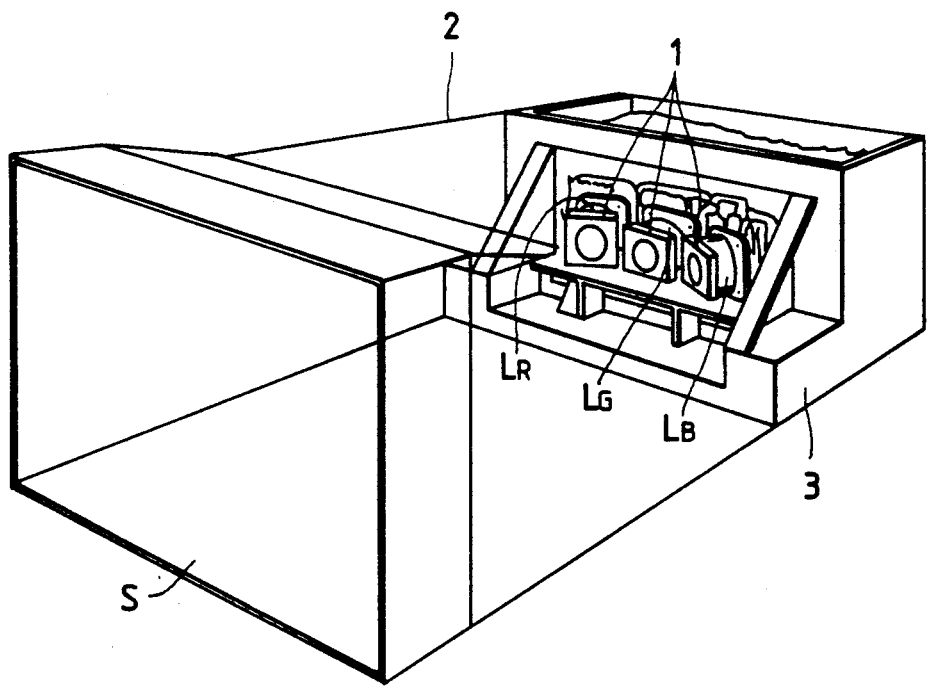
FIG. 5 shows a perspective view of the projection display apparatus of FIG. 4.

An outline of a projection display apparatus PJ incorporating the present invention is illustrated in FIGS. 4 and 5. As shown, the projection display apparatus PJ, shaped like a box, is made up of a casing 2, a CRT block 3 located at the base of the casing 2, and a screen S defining the front side of the casing 2.

Figure 6:
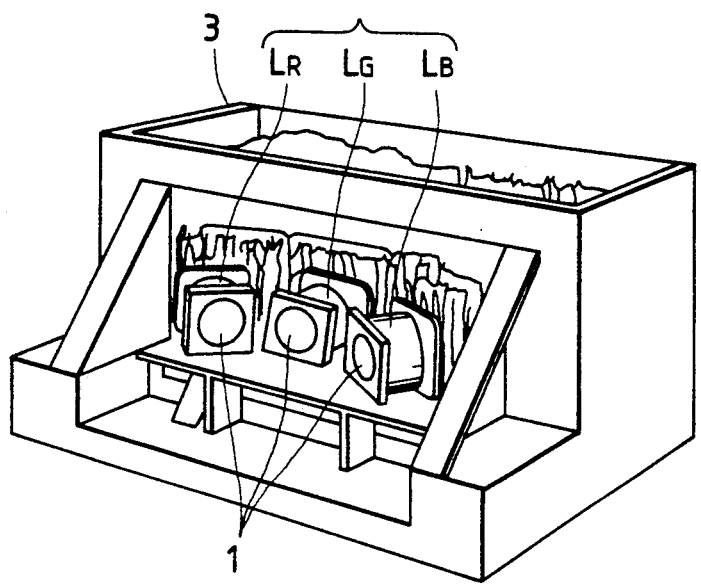
FIG. 6 shows a perspective view of a CRT block of the projection display apparatus of FIG. 4.

CRT block 3 comprises three projection tubes CRTR, CRTG and CRTB for projecting monochromatic colors of red (R), green (G), and blue (B), which are arrayed in an in-line fashion, projection lenses LR, LG, and LB respectively located close to the front sides of the projection tubes CRTR, CRTG and CRTB as viewed in the projection direction, drive circuits (not shown) of those tubes, and the like. As shown in FIGS. 4 and 6, color temperature correctors 1 are located in approximation with the front sides of the projection lenses LR, LG, and LB as viewed in the projection direction.

The layout of the projection tubes CRTR, CRTG and CRTB, the projection lenses LR, LG, and LB, and the color temperature correctors 1, is illustrated in FIG. 4. The projection tubes CRTR, CRTG and CRTB for projecting the R, G and B lights are oriented at predetermined angles with respect to the screen S so that those lights are exactly focused on the screen S, thereby to prevent displacement of the colors from one another. As shown, the projection lenses LR, LG, and LB, which are located close to the font sides of projection tubes CRTR, CRTG and CRTB, are placed in the optical paths of those tubes, respectively. The color temperature correctors 1 are placed in the front of the projection lenses LR, LG and LB.

Figure 7:
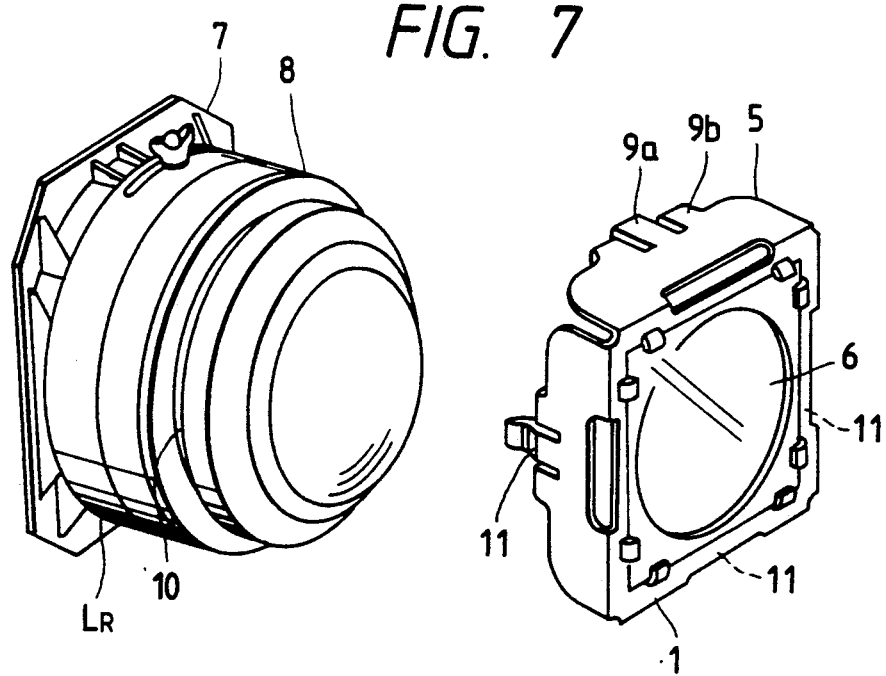
FIG. 7 is a perspective view showing a color temperature corrector.
Figure 8:
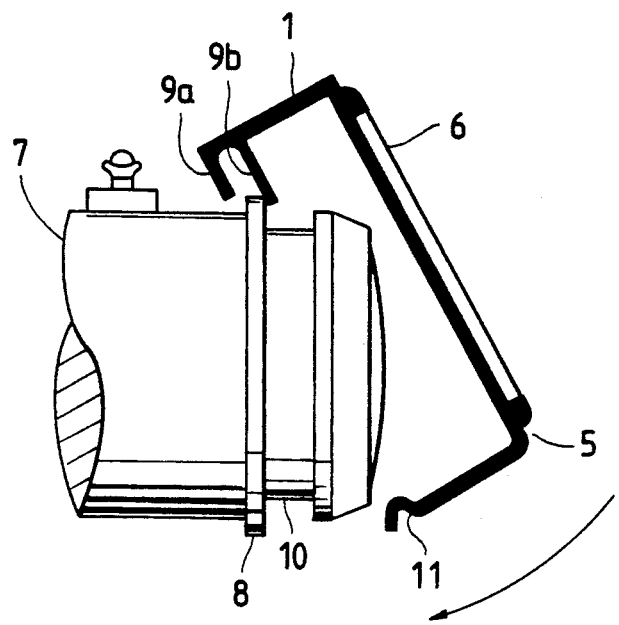
FIG. 8 is a diagram showing how the color temperature corrector is attached to a casing of a projection lens.

An example of one of the color temperature correctors 1 is shown in FIG. 7. As shown, the color temperature corrector 1 includes a casing 5 with a coupling means which is used when the color temperature corrector 1 is attached to the projection lens (in this instance, the projection lens LR), and a filter portion 6 containing an ND (neutral density) filter. The color temperature correctors 1 are respectively attached to the projection lenses LR, LG, and LB. The coupling means consists of four side walls upstanding from the four sides of the square base of the casing 5; one including first and second engaging portions 9a and 9b, and the remaining three side walls including three fixing portions 11. As shown in FIGS. 7 and 8, the first and second engaging portions 9a and 8b extend from the top edge of the side wall of the casing 5 of the color temperature corrector 1, and are orthogonally bent at different positions downwardly. The bent parts of the engaging portions 9a and 9b form a space therebetween (see FIG. 8). When the color temperature corrector 1 is attached to the projection lens LR, the space receives a protruded ring 8 of a casing 7 of the lens LR. The three fixing portions 11, which respectively extend from the top edges of the side walls of the casing 5, are each shaped like V as viewed in cross section (see FIG. 8), and are flexible. Normally, those fixing portions 11 posture inwardly from the extensions of the side walls of the casing 5.

Figure 9:
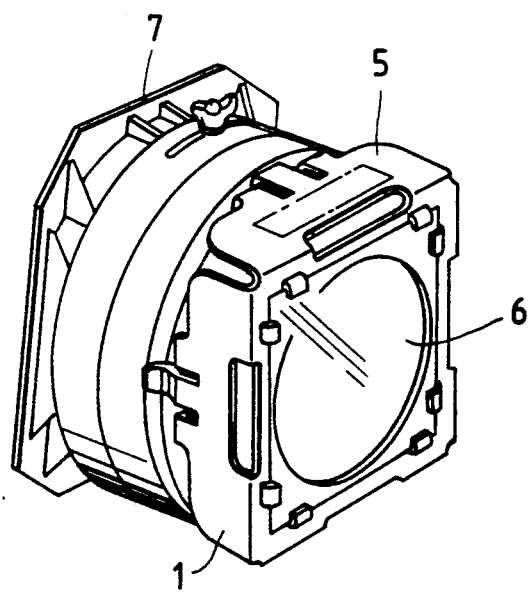
FIG. 9 is a perspective view showing a color temperature corrector after it is attached to the casing.

To attach the color temperature corrector 1 to the lens LR, the color temperature corrector 1 is slantly put on the lens LR in such a way that the first engaging portion 9a is made to engage the outside of the protruded ring 8 of the casing 7 of the lens LR, . and the second engaging portion 9b is put in a groove 10 of the casing 7 (see FIG. 8). Then, the side walls of the casing 5 including the three fixing portions 11 are pushed toward the casing 7 of the lens LR in the direction of arrow, until the attaching of the color temperature corrector 1 to the lens LR as shown in FIG. 9, is completed, that is, the side walls including the fixing portions 11 outwardly expand, and the fixing portions 11 ride on the protruded ring 8, drop on the outside of the protruded ring 8, and are fixed thereat. In this way, the color temperature corrector 1 may be readily and reliably attached to the projection lens LR. To remove the color temperature corrector 1 from the lens, the reverse procedure is taken. The same thing is true for the attaching and removal of the color temperature corrector 1 to the remaining lenses LG and LB.

Figure 10:
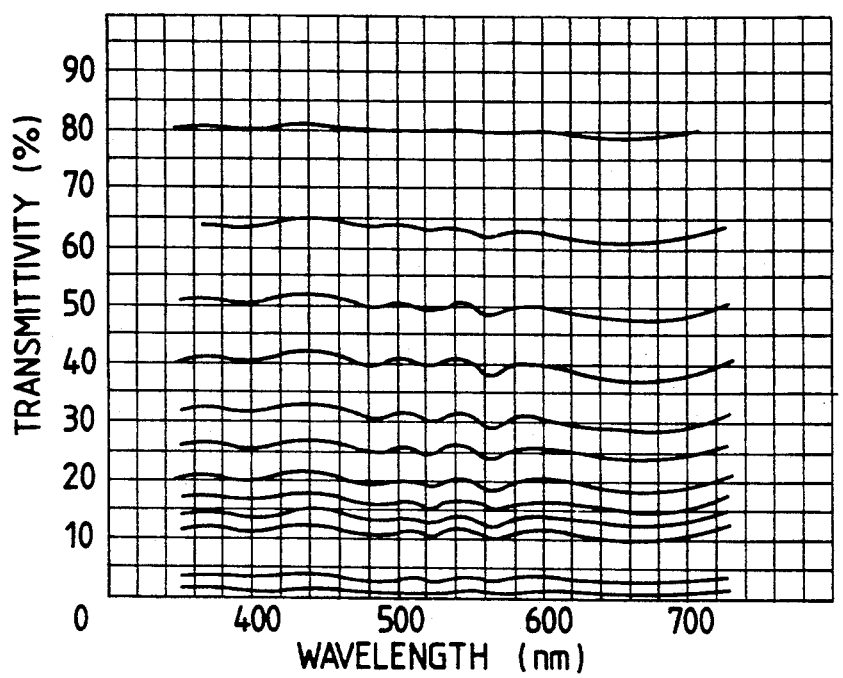
FIG. 10 is a graphical representation of a transmittivity vs. wavelength characteristic of an ND filter.

FIG. 10 is a graph showing transmittivity relating to wave-length characteristic of an ND filter when its transmittivity is varied. As seen from those curves representing variations of the transmittivities with respect to wave lengths, the ND filter exhibits substantially constant transmittivities over a broad range of wavelengths. This fact explicitly indicates that the ND filter may reduce only the amount of light without changing the spectral components.

Figure 11:
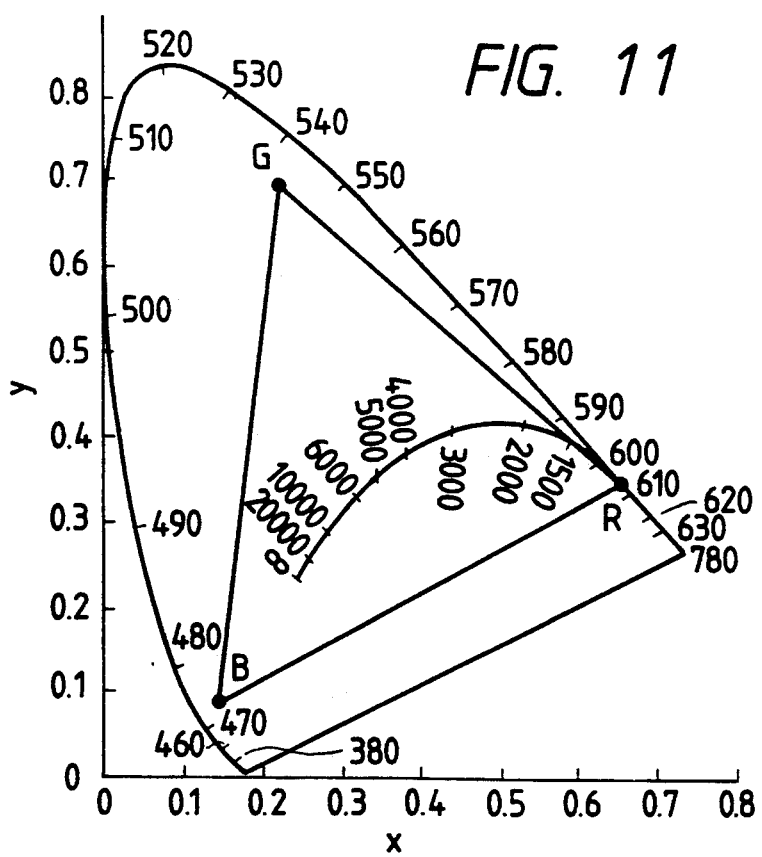
FIG. 11 is a graphical representation of a chromaticity.

FIG. 11 shows the standard chromaticity diagram of C.I.E. 1931 which is well known. In the graph, x and y expresses chromaticity coordinates.

Black dots R, G and B in the graph represent three primary colors employed in the NTSC system. An area within a triangle connecting the three black dots represents a color reproduction area of the NTSC system. A curve within the color reproduction area indicates a variation of color temperature of an energy emitting black body. Figures along the curve indicate temperatures of the unit of K (Kelvin).

The three projection tubes CRTR, CRTG, and CRTB have the chromaticities at the black dots, respectively. All of the colors within the color reproduction area may be reproduced by the called additive mixture of the three primary colors, viz., adding the lights from the projection tubes CRTR, CRTG, and CRTB in appropriate proportions.

Therefore, a desired color temperature correction can be realized in a manner that ND filters of different transmittivities are attached to the projection tubes CRTR, CRTG, and CRTB, and the amounts of lights projected from those tubes are appropriately changed.

Figure 1:
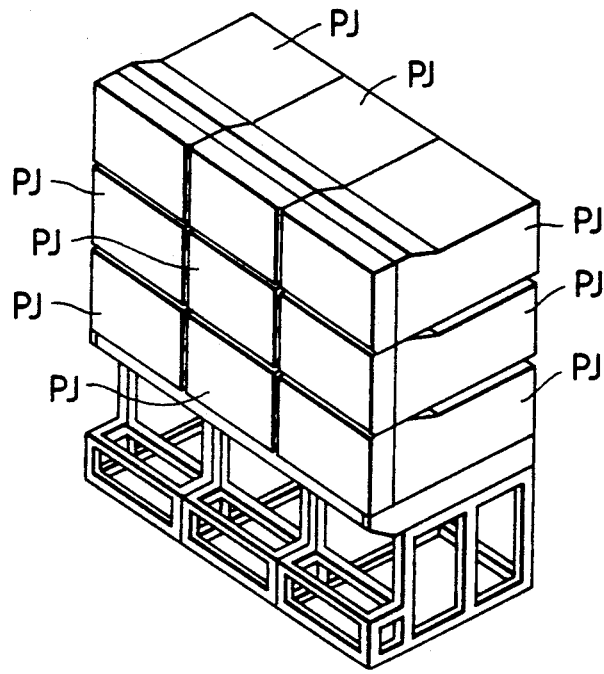
FIG. 1 is a perspective view showing a conventional projection display apparatus using a multi-screen.
Figure 2:
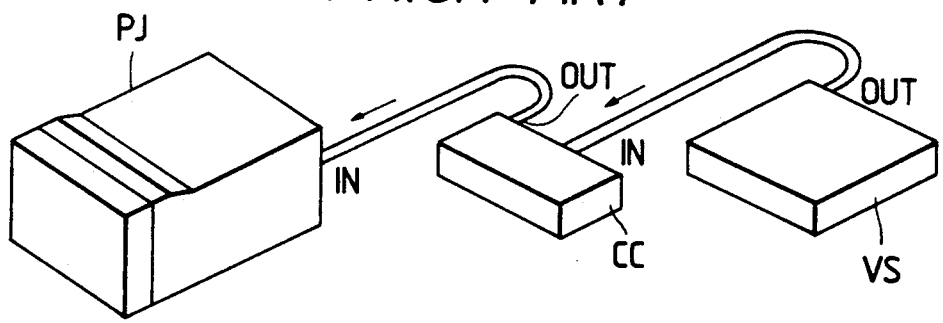
FIG. 2 is an explanatory diagram showing a conventional projection display apparatus of the color collector system.
Figure 3:
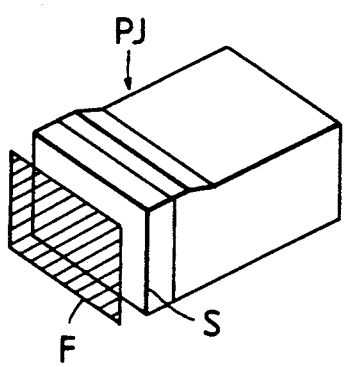
FIG. 3 is a perspective view showing a conventional projection display apparatus of the colored film system.

Also in the case of the multi-screen using a plurality of projection display apparatus as shown in FIG. 1, the color temperatures of an image projected onto the viewing screen by attaching the color temperature correctors respectively to the projection display apparatus.

Where the display apparatus are installed in another location and another color temperature correction is required, replacement of only the color temperature correctors suffices. This provides an easy handling of the projection display apparatus.

2nd Embodiment

Figure 12:
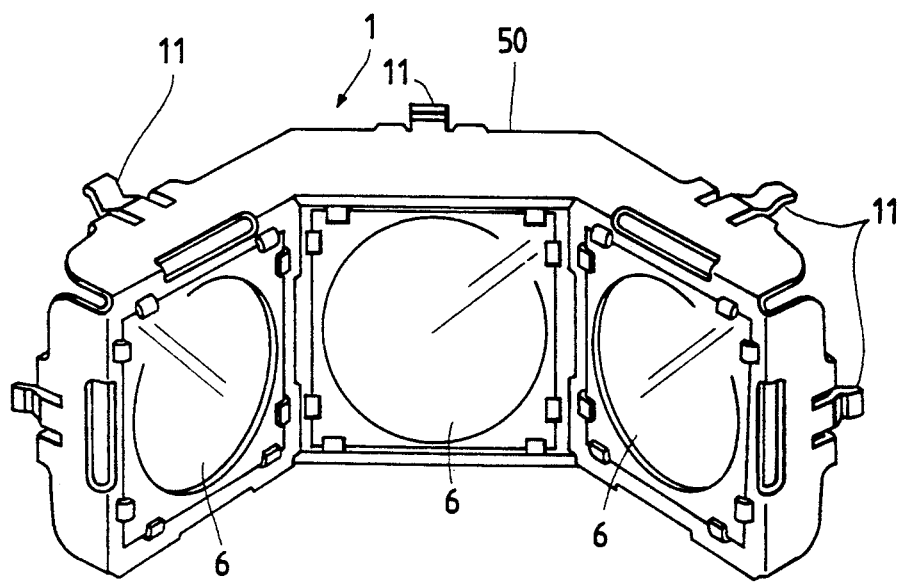
FIG. 12 is a diagram showing a projection display apparatus according to a second embodiment of the present invention.

FIG. 12 shows a diagram useful in showing a second embodiment of a projection display apparatus according to the present invention.

In the figure, like or equivalent portions are designated by like reference numerals in FIG. 7, for simplicity.

The present embodiment is featured in that a single casing 50 contains three ND filters of different tansmittivities corresponding to the three primary colors R, G and B. This arrangement makes it easy to attach the color temperature corrector 1 to the lenses.

3rd Embodiment

Figure 13:
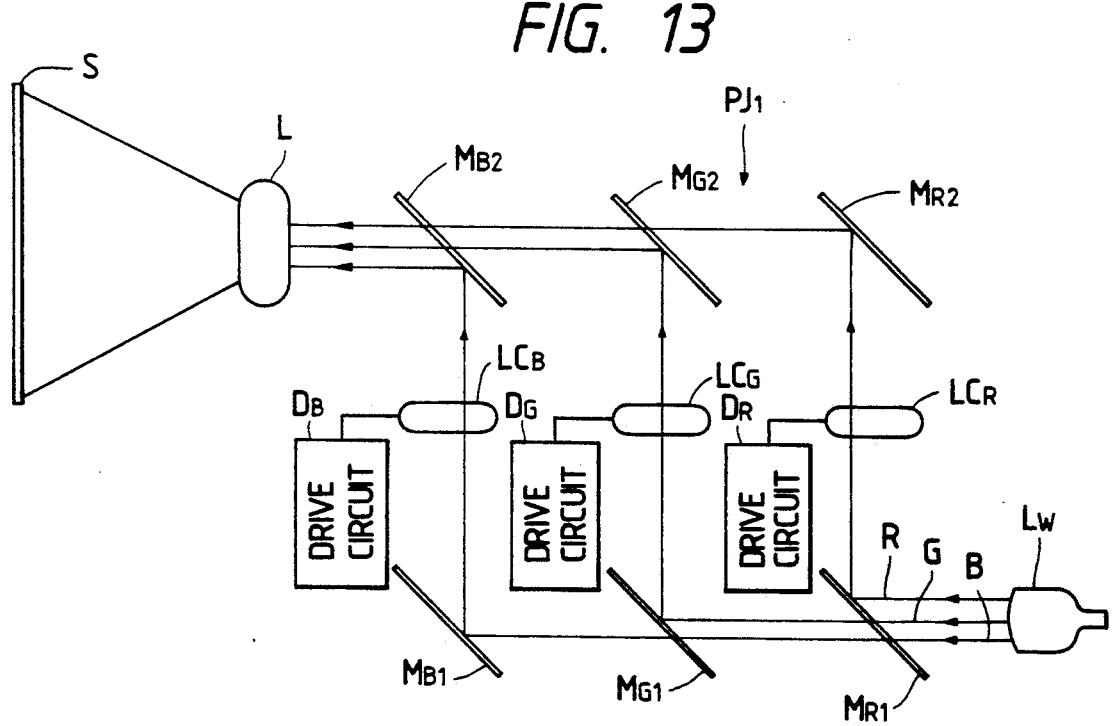
FIG. 13 shows a schematic illustration of a projection display apparatus according to a second embodiment of the present invention.

FIG. 13 shows a schematic illustration of a liquid-crystal projection display apparatus to which a projection display apparatus according to the present invention is applied.

As shown, the liquid-crystal projection display apparatus PJ1 comprises an incandescent light source LW, a couple of reflecting mirrors MR1 and MR2 which reflect only the R (red) component of the light emitted from the light source LW but allow the remaining color components to transmit therethrough, a couple of reflecting mirrors MG1 and MG2 which reflect only the G (green) component of the light emitted from the light source LW, but allow the remaining color components to transmit therethrough, a couple of reflecting mirrors MB1 and MB2 which reflect only the B (blue) component of the light emitted from the light source LW, but allow the remaining color components to transmit therethrough, three liquid-crystal shutters LCR, LCG, and LCB located in the optical paths of the R, G and B lights, drive circuits DR, DG and DB for driving the liquid- crystal shutters LCR, LCR, and LCB, a projection lens L for projecting an image on a viewing screen S of the reflected or transmitted type, and the screen S.

Figure 14:
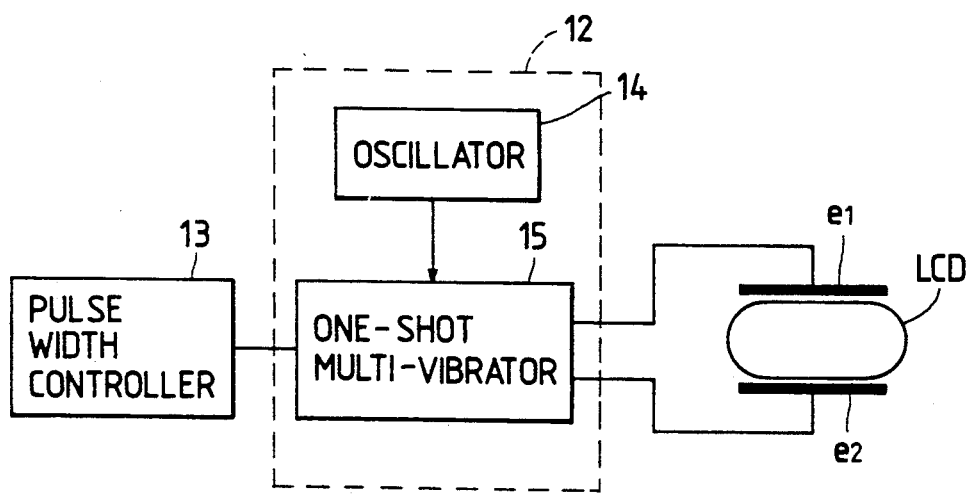
FIG. 14 is a block diagram showing a drive circuit for driving a liquid crystal shutter.

As shown in FIG. 14, the drive circuit DR, DG, and DB for driving the liquid-crystal shutters include each a couple of electrodes $e_1$ and $e_2$ sandwiching a liquid crystal display LCD, a driver 12 for actually driving the liquid crystal display LCD, and a pulse width controller 13 for controlling the pulse width to change a shutter speed. The driver 12 includes an oscillator 14 and a one-shot multi-vibrator 15 for controlling the pulse width.

An operation of the liquid-crystal projection display apparatus thus arranged will be described. For simplicity of explanation, the control operation of only the G component of the light emitted from the light source LW will be discussed.

It is assumed that the pulse width for dark green is 5 $\mu$s and that for light green, 0.1 $\mu$s, normally. If the amounts of the lights are required to decrease, it can be obtained by the pulse widths being respectively reduced to 4.5 $\mu$s and 0.07 $\mu$s by the pulse control circuit. If the same is correspondingly applied to the R and B components, an image at a desired color temperature can be formed on the screen.

4th Embodiment

A fourth embodiment of the present invention is featured in that as for the color temperature correctors 1, an example of which is shown in FIG. 7, liquid-crystal shutters are used in the filter portion 6 in place of the ND filters applied to the individual lenses in the first and second embodiments. The amount of transmitted light is reduced by changing the shutter speed of each shutter.

With the arrangement, a color temperature of an image on the screen can be controlled to be a desired one as done by the first and second embodiments using the ND filters. The remaining arrangement and operation of the fourth embodiment are similar to those of the first and second embodiments.

When the fourth embodiment is applied to the multiscreen projection display apparatus as shown in FIG. 1, the color temperature can be controlled, even after the apparatus is assembled, thereby providing the best control of the color temperature.

5th Embodiment

While a single ND filter is applied to each projection tube, a plurality of ND filters may be used for the projection tube. This expands a range of adjusting color temperatures. If necessary, a combination of the ND filter and the liquid-crystal filter may be used for the single projection tube.

In the first embodiment of FIG. 4, the color temperature correctors 1 are placed between the projection lenses LR, LG, and LB and the screen S. If required, the correctors 1 may be placed between the projection lenses LR, LG, and LB and the projection tubes CRTR, CRTG, and CRTB, respectively.

Additionally, a single color temperature corrector may be applied to any of the three projection tubes, not all of the projection tubes.

As seen from the foregoing description, the color temperature can be finely and subtly adjusted, because the amounts of the color components R, G and B can be controlled individually. The color temperature correctors are disposed closer to the projection lenses in the optical path between the screen and the light source. Because of this feature, the projection display apparatus may be reduced in size and easy in handling.

Having described some specific embodiments of our bearing, it should be understood that the present invention may be variously changed and modified within the spirit and scope of the invention as set forth in the appended claims.

What is claimed is:

1. A projection display apparatus for projecting light containing red, green and blue components emitted from a light source means onto a screen by projection lenses, said projection display apparatus comprising:
    color temperature correcting means for correcting a color temperature of an image on said screen, said color temperature correcting means being disposed close to said projection lenses in an optical path between said screen and said light source means to individually correct the amounts of the red, green and blue components contained within the light;
    wherein said color temperature correcting means comprises neutral density (ND) filters and wherein said neutral density (ND) filters are detachably coupled with said projection lenses.

2. A projection display apparatus as claimed in claim 1, wherein said neutral density filters are contained in a casing.

3. A projection display apparatus for projecting light containing red, green and blue components emitted from light source means on a screen by projection lenses, said projection display apparatus comprising:
    color temperature correcting means for correcting a color temperature of an image on said screen, said color temperature correcting means being disposed close to said projection lenses in an optical path between said screen and said light source means to individually correct the amounts of the red, green and blue components contained within the light;
    wherein said color temperature correcting means comprises color dividing means for dividing the light emitted from said light source means into red, green and blue components; three liquid-crystal shutters located in the optical paths of red, green and blue paths; and drive circuits for driving said liquid-crystal shutters.

4. A projection display apparatus as claimed in claim 3, wherein said color dividing means comprises a couple of reflecting mirrors which reflect only the red component but allow the remaining color components to transmit therethrough, a couple of reflecting mirrors which reflect only the green component but allow the remaining color components to transmit therethrough, a couple of reflecting mirrors which reflect only the blue component but allow the remaining color components to transmit therethrough.

5. A projection display apparatus as claimed in claim 3, wherein said drive circuits comprises a driver for driving said liquid-crystal shutters and a pulse width controller for controlling the width of an electrical pulse input to said driver to change the liquid-crystal shutter speed.

6. A projection display apparatus for projecting light containing red, green and blue components emitted from light source means on a screen by projection lenses, said projection display apparatus comprising:
    color temperature correcting means for correcting a color temperature of an image on said screen, said color temperature correcting means being disposed close to said projection lenses in an optical path between said screen and said light source means to individually correct the amounts of the red, green and blue components contained within the light;
    wherein said color temperature correcting means comprises liquid-crystal shutters detachably coupled with said projection lens means and a drive circuit for driving said liquid-crystal shutters.

* * * * *

UNITED STATES PATENT AND TRADEMARK OFFICE
CERTIFICATE OF CORRECTION

PATENT NO. :   5,105,263
DATED      :   April 14, 1992
INVENTOR(S) :  KATSUNOBU SHIODA It is certified that error appears in the above-identified patent and that said Letters Patent is hereby corrected as shown below:

Claim 5, column 8, line 37, change "comprises" to --comprise--.

Signed and Sealed this

Seventh Day of December, 1993

Attest:

BRUCE LEHMAN

*Attesting Officer*  *Commissioner of Patents and Trademarks*